(12) United States Patent
Haneda (10) Patent No.: US 10,528,072 B2
(45) Date of Patent: Jan. 7, 2020

(54) INPUT VOLTAGE CONTROL DEVICE HAVING THREE POWER LINES

(71) Applicant: NTN CORPORATION, Osaka-shi, Osaka (JP)

(72) Inventor: Masaji Haneda, Omihachiman (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 16/086,242

(22) PCT Filed: Mar. 9, 2017

(86) PCT No.: PCT/JP2017/009476
§ 371 (c)(1),
(2) Date: Sep. 18, 2018

(87) PCT Pub. No.: WO2017/159536
PCT Pub. Date: Sep. 21, 2017

(65) Prior Publication Data
US 2019/0165574 A1    May 30, 2019

(30) Foreign Application Priority Data

Mar. 18, 2016 (JP) ................................. 2016-055821

(51) Int. Cl.
*G05F 5/00* (2006.01)
*H02J 3/38* (2006.01)
(Continued)

(52) U.S. Cl.
CPC ............. *G05F 5/00* (2013.01); *G05B 19/042* (2013.01); *H02J 1/00* (2013.01); *H02J 3/383* (2013.01);
(Continued)

(58) Field of Classification Search
CPC ... H02M 3/155–1588; G05F 5/00; H02J 1/00; H02J 3/383; H02H 3/243
See application file for complete search history.

(56) References Cited

U.S. PATENT DOCUMENTS

| 4,479,174 A | * | 10/1984 | Cates ................ H02M 3/33507 363/21.11 |
| 5,754,414 A | * | 5/1998 | Hanington ............... H02M 3/28 363/21.12 |

(Continued)

FOREIGN PATENT DOCUMENTS

| JP | 2007-215300 A | 8/2007 |
| JP | 2013-126277 A | 6/2013 |

(Continued)

OTHER PUBLICATIONS

Japan Patent Office, International Search Report and Written Opinion of the International Searching Authority in PCT/JP2017/009476, dated Apr. 11, 2017, which is the international application to this U.S. application.

*Primary Examiner* — Yusef A Ahmed
(74) *Attorney, Agent, or Firm* — Kolitch Romano LLP (57) ABSTRACT

An input voltage control device including a first power line inputted with a voltage of 300V to 380V and a second power line inputted with a voltage of 0V. The potential difference between the first power line and the second power line is variable. A constant voltage generator outputs a constant potential voltage of (24V, for example) to a third power line. A reference potential generator outputs a reference potential of (10V, for example). A comparative potential generator outputs a comparative potential which is within the range of (0V to 24V, for example), based on the input voltage. A comparator outputs to an NMOS transistor a conducting potential voltage of (24V, for example) or an interrupting potential voltage of (0V, for example) depending on the (Continued)

comparison between the reference potential and the comparative potential. When the comparator outputs the conducting potential, the path between the source and drain of the NMOS transistor is made conductive. When the comparator outputs the interrupting potential, the path between the source and drain of the NMOS transistor is made non-conductive.

5 Claims, 7 Drawing Sheets (51) Int. Cl.
    *H02J 1/00*              (2006.01)
    *G05B 19/042*       (2006.01)
    *H02H 3/24*            (2006.01)

(52) U.S. Cl.
    CPC ... *G05B 2219/25401* (2013.01); *H02H 3/243* (2013.01)

(56) References Cited

U.S. PATENT DOCUMENTS

| | | | | |
|---|---|---|---|---|
| 10,389,109 | B2* | 8/2019 | Gao | H01L 31/02021 |
| 2002/0039034 | A1* | 4/2002 | Kohda | H02J 9/061 |
| | | | | 326/123 |
| 2002/0141126 | A1* | 10/2002 | Tabata | H03K 17/0828 |
| | | | | 361/93.7 |
| 2006/0028188 | A1* | 2/2006 | Hartular | H02M 3/156 |
| | | | | 323/273 |
| 2007/0013353 | A1* | 1/2007 | Noma | H02M 3/1588 |
| | | | | 323/284 |
| 2007/0241736 | A1* | 10/2007 | Ogiwara | G05F 3/30 |
| | | | | 323/313 |
| 2012/0098517 | A1* | 4/2012 | Esumi | H03K 17/0822 |
| | | | | 323/311 |
| 2014/0152182 | A1* | 6/2014 | Yamamoto | H05B 33/0815 |
| | | | | 315/122 |
| 2015/0263533 | A1* | 9/2015 | Otsuka | H02J 5/005 |
| | | | | 307/104 |
| 2015/0349651 | A1* | 12/2015 | Morota | H02M 3/33523 |
| | | | | 363/21.15 |
| 2016/0006354 | A1* | 1/2016 | Yamaguchi | H02M 3/1563 |
| | | | | 323/282 |
| 2017/0256936 | A1* | 9/2017 | Gao | H02H 7/20 |
| 2018/0026614 | A1* | 1/2018 | Abe | H03K 5/153 |
| | | | | 327/72 |
| 2019/0074761 | A1* | 3/2019 | Matsuda | H02M 1/08 |

FOREIGN PATENT DOCUMENTS

| | | |
|---|---|---|
| JP | 2003-339118 A | 11/2013 |
| JP | 2013-252041 A | 12/2013 |

\* cited by examiner

INPUT VOLTAGE CONTROL DEVICE HAVING THREE POWER LINES

CROSS-REFERENCE TO RELATED APPLICATIONS

This application is a national phase application of PCT/JP2017/009476, filed Mar. 9, 2017, which claims priority to Japanese Application No. 2016-055821, filed Mar. 18, 2016, each of which is hereby incorporated by reference.

FIELD

The present invention relates to an input voltage control device used in a system comprising a DC bus and load devices each connected thereto, the input voltage control device being disposed between the DC bus and each load device so as to control supply of input voltage to each load device.

BACKGROUND

The prior art discloses a distributed power supply system in which multiple variable power generators and multiple load devices are connected to a DC bus. The variable power generators used in the system are, for example, photovoltaic power generators and wind power generators. When the voltage of the DC bus is lowered, the system selectively cuts off power supply to the selected load devices with low importance in a step-by-step-manner according to the voltage level of the DC bus.

On the other hand, with an aim to apply to the smart grid, research and development has been conducted on HVDC (High Voltage Direct Current) power transmission at a voltage level of about 380V. In such a large-scale power transmission system, it is desirable that each of the load devices autonomously control supply of input voltage to itself.

For example, the prior art discloses a voltage conversion device which is capable of, when detecting drop of input voltage to its voltage conversion circuit, decreasing supply of input current to the voltage conversion circuit so as to lower power supplied to a load device by the voltage conversion circuit.

SUMMARY

Japanese Patent Laid-open No. 2003-339118 teaches selecting load devices with low importance according to the voltage level of the DC bus and cutting off power supply to the selected load devices in a step-by-step-manner. However, it does not teach any concrete measure.

Japanese Patent Laid-open No. 2013-126277 teaches a voltage conversion device which decreases supply of power to the load device in response to the drop of the voltage level of the DC bus. However, it is not desirable to gradually decrease power supply to some kind of load devices, such as computers.

In consideration of the above problems of the prior art systems, it is an object of the present invention to provide an input voltage control device used in a system comprising a DC bus and load devices each connected thereto, the input voltage control device being disposed between the DC bus and each load device and capable of controlling power supply to each load device based on the voltage level of the DC bus.

As a solution to the above-mentioned problems, the present invention has been accomplished, the details of which are described below.

Preferably, the input voltage control device according to the present invention system of the present invention is further characterized in that Preferably, the input voltage control device according to the present invention system of the present invention is further characterized in that Preferably, the input voltage control device according to the present invention system of the present invention is further characterized in that Preferably, the input voltage control device according to the present invention system of the present invention is further characterized in that The input voltage control device according to the present invention is capable of controlling power supply to each load device based on the voltage level of the DC bus.

DETAILED DESCRIPTION

Described hereinafter with reference to the attached drawings are detailed embodiments of the input voltage control device according to the present invention. Throughout the figures illustrating exemplary embodiments of the present invention, like reference numerals refer to like members which have similar basic composition and operation.

Figure 1:
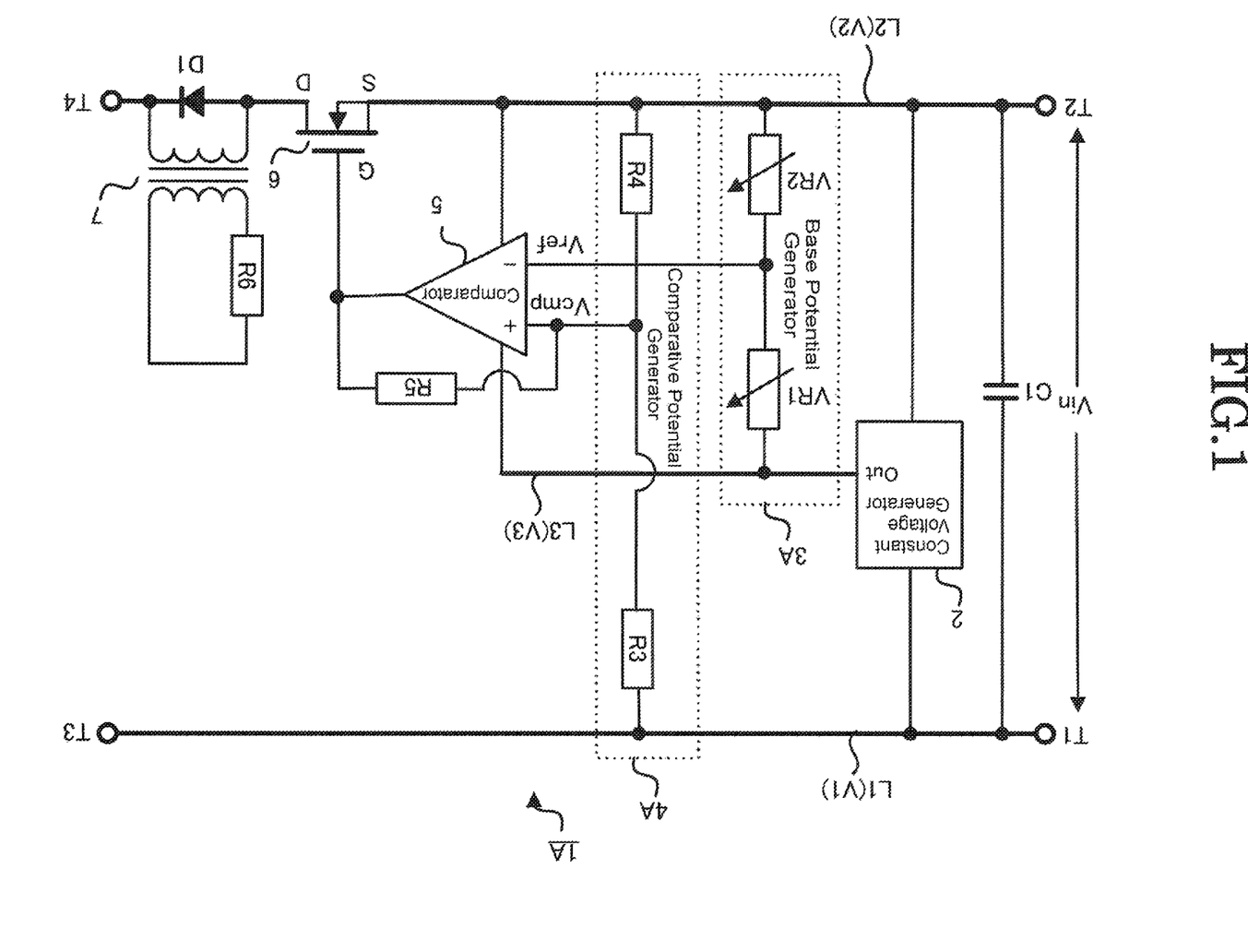
FIG. 1 is a view showing an exemplary configuration of an input voltage control device according to a first embodiment of the present invention.

FIG. 1 is a view showing an exemplary configuration of an input voltage control device 1A according to a first embodiment of the present invention.

The input voltage control device 1A comprises a first power line L1, a second power line L2, a third power line L3, a smoothing condenser C1, a constant voltage generator 2, a reference potential generator 3A, a comparative potential generator 4A, a comparator 5, hysteresis resistor R5, an NMOS transistor 6 (which is a semiconductor device), a transformer 7, a resistor R6 and a diode D1.

The first power line L1 is connected to a terminal T1 and a terminal T3.

The second power line L2 is divided into one line and the other line, having the NMOS transistor 6 therebetween. The one line of the second power line L2 is connected to a terminal T2 and the source electrode of the NMOS transistor 6.

The other line of the second power line L2 is connected to the drain electrode of the NMOS transistor 6 and a terminal T2.

As shown in FIG. 1, the input voltage control device 1A has the transformer 7 and the diode D1 disposed in parallel alignment on the other line of the second power line L2. One end of the primary coil of the transformer 7 and the anode of the diode D1 are connected to the drain electrode (D) of the NMOS transistor 6. The other end of the primary coil of the transformer 7 and the cathode of the diode D1 are connected to the terminal T4. The both ends of the secondary coil of the transformer 7 are connected to the resistor R6 to form a loop.

Configured as in the above, the diode D1 suppresses counter voltage generated when the NMOS transistor 6 is turned off. The mutual induction of the transformer 7 and the resistor restricts current and magnetic saturation when the NMOS transistor 6 is turned on. Thus, the resistor R6 decides the degree of mitigating inrush current to load devices. After inrush current is settled, mutual induction does not occur in the transformer 7, Since the transformer 7 only has coil resistance (almost 0 ohm), it does not cause power loss.

The terminals T1 and T2 are connected to an external DC bus, which is, for example, a part of a high voltage direct current power transmission system. To the terminal T1 is applied a first potential V1. To the terminal T2 is applied a second potential V2. The potential difference between the first potential V1 and the second potential V2 is defined as an input voltage Vin. In one example, the first potential V1 is set to be 380V and the second potential V2 is set to be 0V. In another example, the first potential V1 is set to be 190V and the second potential V2 is set to be −190V. The potentials V1 and V2 (the input voltage Vin) applied to the terminals T1 and T2 are variable.

The terminals T3 and T4 are connected to a load device. The load device may be of various kinds including normal lighting devices, emergency lighting devices, air conditioners, computers and manufacturing devices.

The smoothing condenser C1 has its one end and the other end respectively connected to the first power line L1 and second power line L2. The smoothing condenser C1 smooths fluctuation of the input voltage Vin.

The constant voltage generator 2 operates on the voltage supplied by the first power line L1 and the one line of the second power line L2 (the input voltage Vin) and outputs a third potential V3 from its output terminal (Out) to the third power line L3. The output voltage of the constant voltage generator 2, which is equal to the potential difference between the third potential V3 and the second potential V2 (voltage of 24V, for example), is constant and stable. An exemplary configuration of the constant voltage generator 2 will be described in detail with reference to FIG. 3 afterwards.

The reference potential generator 3A is connected to the third power line L3 and the one line of the second power line L2. The reference potential generator 3A has variable resistors VR1 and VR2. The variable resistor VR1 has an end connected to the third power line L3 and the other end connected to an end of the variable resistor VR2. The variable resistor VR2 has the other end connected to the one line of the second power line L2. The reference potential generator 3A divides the potential difference (or voltage) between the third potential V3 and the second potential V2 by means of the variable resistors VR1 and VR2 so as to generate and output a reference potential Vref.

The comparative potential generator 4A is connected to the first power line L1 and the one line of the second power line L2. The comparative potential generator 4A has resistors R3 and R4. The resistor R3 has an end connected to the first power line L1 and the other end connected to an end of the resistor R4. The resistor R4 has the other end connected to the one line of the second power line L2. The potential difference between the first potential V1 and the second potential V2 (or input voltage Vin) is variable. The comparative potential generator 4A divides the input voltage Vin by means of the resistors R3 and R4 so as to generate and output a comparative voltage Vcmp (voltage of 0V to 24V, for example) which is within the range of the potential difference between the third potential V3 and the first potential V1.

The comparator 5 operates on the voltage (the potential difference between the third potential V3 and the second potential V2, for example, voltage of 24V) supplied by the third power line L3 and the one line of the second power line L2. The comparator 5 has an inverted input terminal, to which the reference potential Vref outputted from the reference potential generator 3A is inputted. The comparator 5 has a non-inverted input terminal, to which the comparative voltage Vcmp outputted from the comparative potential generator 4A is inputted. The comparator 5 outputs a conducting potential (voltage of 24V, for example) or an interrupting potential (voltage of 0V, for example) depending on the comparison between the reference potential Vref and the comparative potential Vcmp.

The output terminal and the non-inverted input terminal are connected to each terminal of the hysteresis resistor R5. The hysteresis resistor R5 imparts hysteresis to the output of the comparator 5. If the hysteresis resistor R5 is not present, the comparator 5 outputs the conducting potential when the comparative potential Vcmp is higher than the reference potential Vref and the interrupting potential when the comparative potential Vcmp is lower than the reference potential Vref. However, by the effects of hysteresis, the comparative potential Vcmp which was higher than the reference potential Vref gradually drops and when the comparative potential Vcmp becomes lower than the reference potential Vref to a certain degree, the comparator 5 alters its output from the conducting potential to the interrupting potential. On the other hand, the comparative potential Vcmp which was lower than the reference potential Vref gradually raises and when the comparative potential Vcmp becomes higher than the reference potential Vref to a certain degree, the comparator 5 alters its output from the interrupting potential to the conducting potential.

As described in the above, the source electrode of the NMOS transistor 6 is connected to the one line of the second power line L2 and the drain electrode to the other line of the second power line L2. The gate electrode of the NMOS transistor 6 is connected to the output end of the comparator 5. The NMOS transistor 6 allows the source-drain current path to conduct when a conducting potential (voltage of 24V, for example) is inputted to its gate electrode, thereby supplying power to the load device connected to the terminals T3 and T4. The NMOS transistor 6 interrupts the source-drain current path when an interrupting potential (voltage of 0V, for example) is inputted to its gate electrode, thereby interrupting power supply to the load device.

Figure 2:
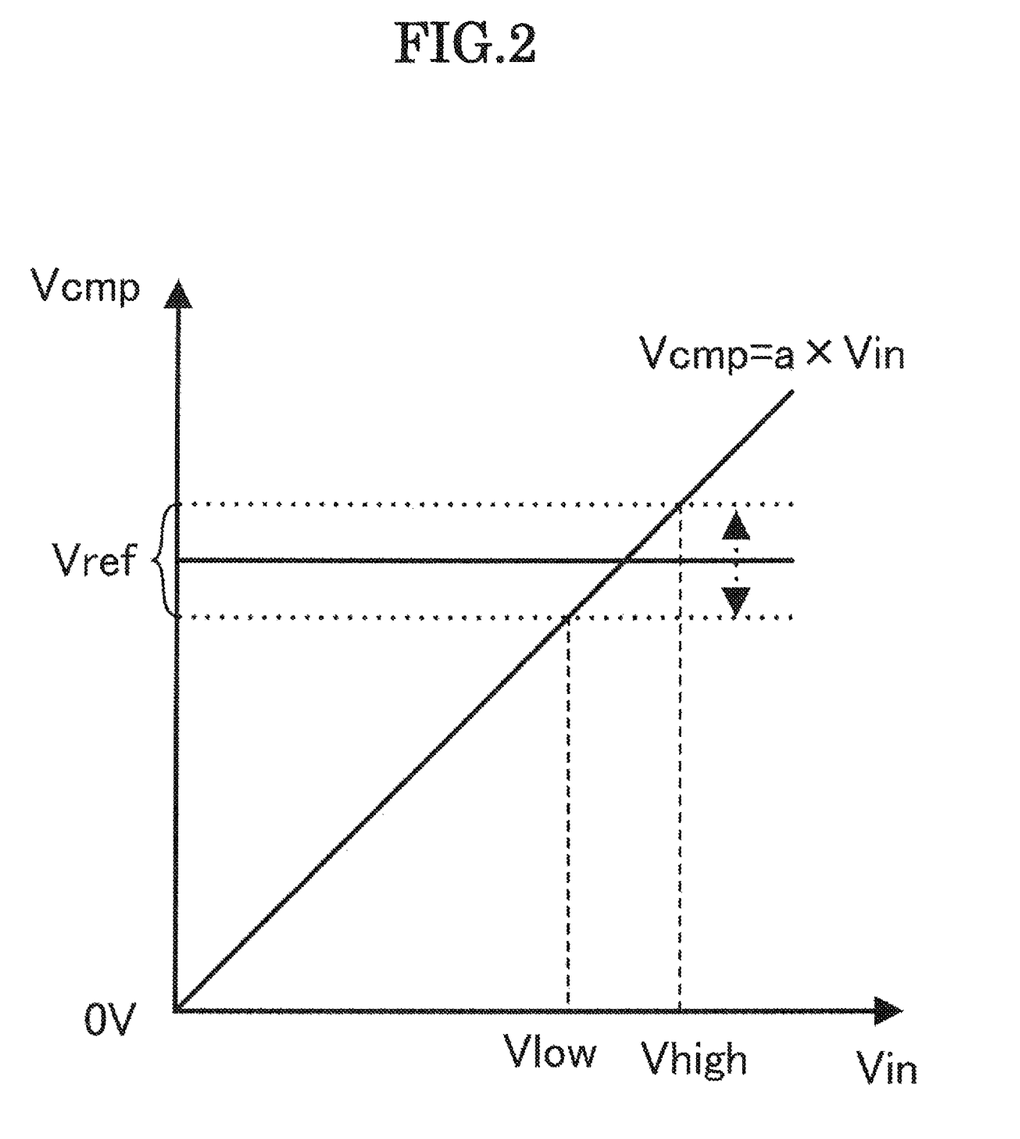
FIG. 2 is a view showing an example of relationship between an input voltage, a reference potential and a comparative potential in the input voltage control device shown in FIG. 1.

FIG. 2 is a view showing an example of the relationship between the input voltage Vin, the reference potential Vref and the comparative potential Vcmp in the input voltage control device 1A shown in FIG. 1.

Assuming the resistance values of the variable resistors VR1 and VR2 as vr1 and vr2 respectively, the value of the reference potential Vref is given by the below formula (1).

$$Vref = \frac{vr2}{vr1 + vr2} \times V3 \quad (1)$$

On the other hand, assuming the resistance values of the resistors R3 and R4 as r3 and r4 respectively, the value of the comparative potential Vcmp is given by proportionally dividing the value of the input voltage Vin as shown in the below formula (2). Given the dividing ratio as a as shown in the below formula (3), the value of the comparative potential Vcmp is given by the below formula (4).

$$Vcmp = \frac{r4}{r3 + r4} \times Vin \quad (2)$$

$$a = \frac{r4}{r3 + r4} \quad (3)$$

$$Vcmp = a \times Vin \quad (4)$$

As shown in FIG. 2, the comparative potential Vcmp represents a line with a gradient a. On the other hand, although the reference potential Vref represents a horizontal line, its value is variable according to the change in the resistance value of vr1 and vr2.

Ignoring the existence of the hysteresis resistor R5, the output of the comparator 5 is altered from the conducting potential to the interrupting potential, or vice versa, at the intersecting point of the line of the comparative potential Vcmp and the line of the reference potential Vref. For example, in case the reference potential Vref is set to be a higher value, the output of the comparator 5 is altered from the conducting potential to the interrupting potential, or vice versa, at the time when the input voltage Vin becomes Vhigh. On the other hand, in case the reference potential Vref is set to be a lower value, the output of the comparator 5 is altered from the conducting potential to the interrupting potential, or vice versa, at the time when the input voltage Vin becomes Vlow.

As described in the above, the input voltage control device 1A according to the first embodiment of the present invention enables it to control power supply to various load devices adaptively to their input voltages Vin by regulating the resistance values of the variable resistor VR1 and the variable resistor VR2 in the reference potential generator 3A.

The reference potential generator 3A may have one invariable resistor, instead of having the two variable resistors VR1 and VR2.

Figure 3:
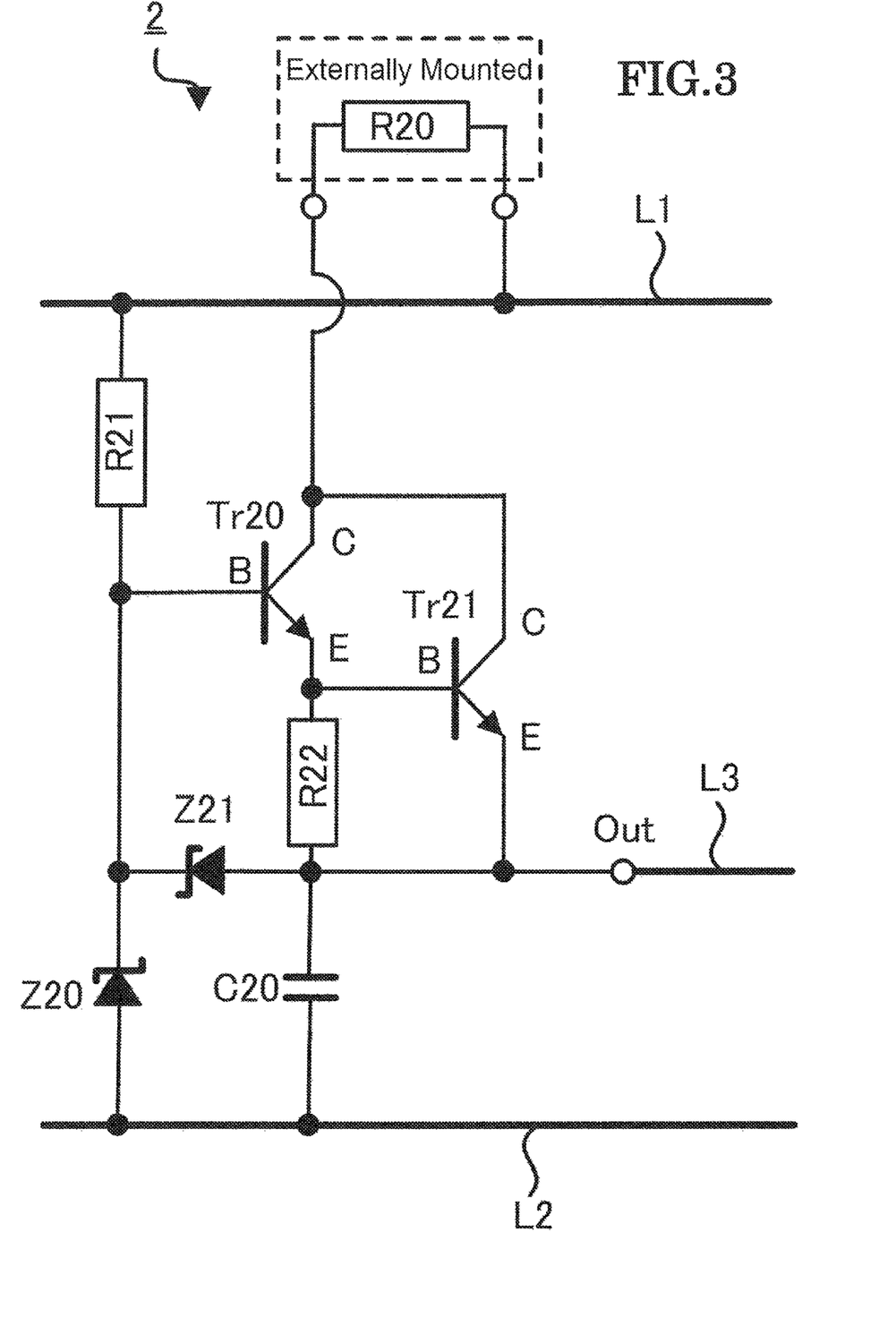
FIG. 3 is a view showing an exemplary configuration of a constant voltage generator.

FIG. 3 is a view showing an exemplary configuration of the constant voltage generator 2.

The constant voltage generator 2 comprises Zener diodes Z20 and Z21, NPN transistors Tr20 and Tr21, a resistors R20, R21 and R22, and a condenser C20.

The Zener diode Z20 has its anode connected to the second power line L2 and its cathode connected to an end of the resistor R21. The resistor R21 has the other end connected to the first power line L1.

The NPN transistors Tr20 and Tr21 are Darlington connected.

The NPN transistor Tr20 has its base connected to the cathode of the Zener diode Z20 and an end of the resistor R21. The NPN transistor Tr20 has its emitter connected to the output terminal Out through the resistor R22. The NPN transistor Tr21 has its emitter connected to the output terminal Out.

The NPN transistor Tr20 has its collector connected to an end of the resistor R20. The NPN transistor Tr21 has its collector connected to an end of the resistor R20. The resistor R20 has the other end connected to the first power line L1. The resistor R20 is mounted externally to the input voltage control device 1A so as to radiate its heat.

The Zener diode Z21 has its anode connected to the output terminal Out and its cathode connected to the cathode of the Zener diode Z20 and an end of the resistor R21.

The condenser C20 has its one end connected to the second power line L2 and the other end connected to the output terminal Out.

The constant voltage generator 2 outputs a constant and stable voltage (voltage of 24V, for example) from its output terminal Out.

Figure 4:
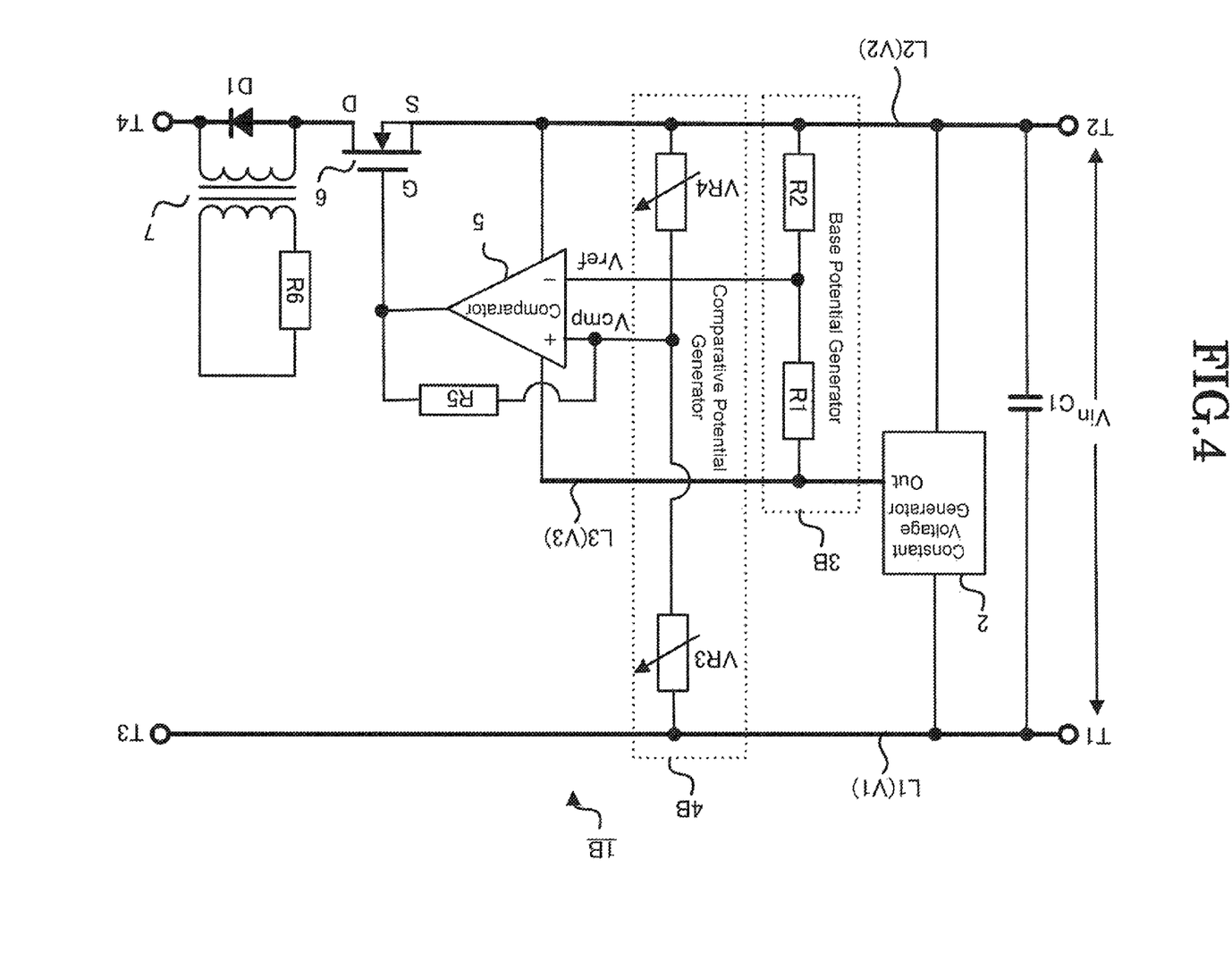
FIG. 4 is a view showing an exemplary configuration of an input voltage control device according to a second embodiment of the present invention.

FIG. 4 is a view showing an exemplary configuration of an input voltage control device 1B according to a second embodiment of the present invention.

The input voltage control device 1B comprises a first power line L1, a second power line L2, a third power line L3, a smoothing condenser C1, a constant voltage generator 2, a reference potential generator 3B, a comparative potential generator 4B, a comparator 5, hysteresis resistor R5, an NMOS transistor 6 (which is a semiconductor device), a transformer 7, a resistor R6 and a diode D1.

The input voltage control device 1B differs from the input voltage control device 1A of the first embodiment in the configuration of the reference potential generator 3B and the comparative potential generator 4B. Other members of the input voltage control device 1B are configured in the same way as those of the input voltage control device 1A.

The reference potential generator 3B is connected to the third power line L3 and the one line of the second power line L2. The reference potential generator 3B has resistors R1 and R2. The resistor R1 has an end connected to the third power line L3 and the other end connected to an end of the resistor R2. The resistor R2 has the other end connected to the one line of the second power line L2. The reference potential generator 3B divides the potential difference (or voltage) between the third potential V3 and the second potential V2 by means of the resistors R1 and R2 so as to generate and output a reference potential Vref.

The comparative potential generator 4B is connected to the first power line L1 and the one line of the second power line L2. The comparative potential generator 4B has variable resistors VR3 and VR4. The variable resistor VR3 has an end connected to the first power line L1 and the other end connected to an end of the variable resistor VR4. The variable resistor VR4 has the other end connected to the one line of the second power line L2. The potential difference between the first potential V1 and the second potential V2 (or input voltage Vin) is variable. The comparative potential generator 4B divides the input voltage Vin by means of the variable resistors VR3 and VR4 so as to generate and output a comparative voltage Vcmp (voltage of 0V to 24V, for example) which is within the range of the potential difference between the third potential V3 and the first potential V1.

Figure 5:
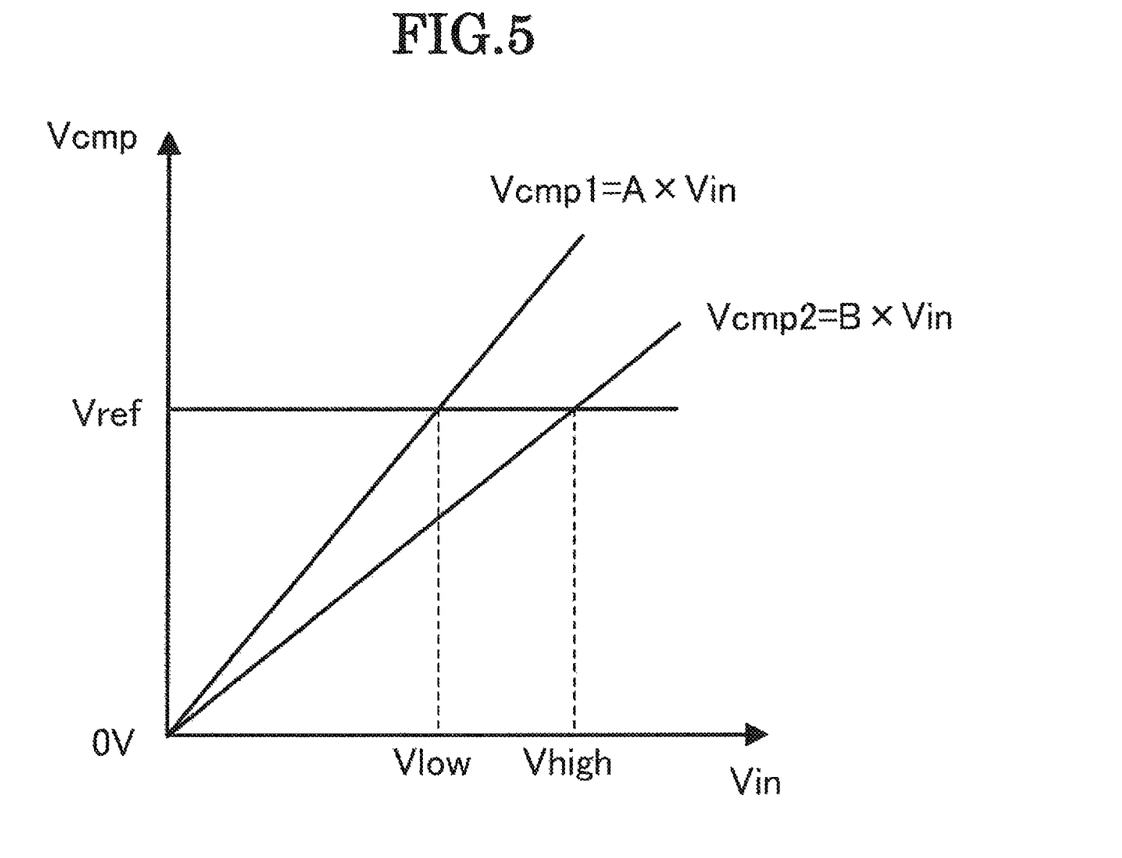
FIG. 5 is a view showing an example of relationship between an input voltage, a reference potential and a comparative potential in the input voltage control device shown in FIG. 4.

FIG. 5 is a view showing an example of the relationship between the input voltage Vin, the reference potential Vref and the comparative potential Vcmp in the input voltage control device 1B shown in FIG. 4.

Assuming the resistance values of the resistors R1 and R2 as r1 and r2 respectively, the value of the reference potential Vref is given by the below formula (5).

$$Vref = \frac{r2}{r1+r2} \times V3 \quad (5)$$

On the other hand, assuming that the resistance values of the variable resistors VR3 and VR4 are vr3 and vr4 respectively, the value of the comparative potential Vcmp is given by proportionally dividing the value of the input voltage Vin as shown in the below formula (6). Given the dividing ratio A as shown in the below formula (7), the value of a comparative potential Vcmp1 is given by the below formula (8). When the resistance values of the variable resistors VR3 and VR4 are changed to be vr3' and vr4' respectively, given the dividing ratio as B as shown in the below formula (9), the value of a comparative potential Vcmp2 is given by the below formula (10).

$$Vcmp = \frac{vr4}{vr3+vr4} \times Vin \quad (6)$$

$$A = \frac{vr4}{vr3+vr4} \quad (7)$$

$$Vcmp1 = A \times Vin \quad (8)$$

$$B = \frac{vr4'}{vr3'+vr4'} \quad (9)$$

$$Vcmp2 = B \times Vin \quad (10)$$

As shown in FIG. 5, the comparative potentials Vcmp1 and Vcmp2 respectively represent lines with gradients A and B. The gradient A is set to be higher than B. On the other hand, the reference potential Vref represents a horizontal line.

Ignoring the existence of the hysteresis resistor R5, the output of the comparator 5 is altered from the conducting potential to the interrupting potential, or vice versa, at the intersecting point of either line of the comparative potential Vcmp1 or Vcmp2 and the line of the reference potential Vref. The line of the comparative potential Vcmp1, which has a larger gradient than the comparative potential Vcmp2, intersects the line of the reference potential Vref when the input voltage Vin is Vlow, thereby altering the output of the comparator 5 from the conducting potential to the interrupting potential, or vice versa. On the other hand, the line of the comparative potential Vcmp2 intersects the line of the reference potential Vref when the input voltage Vin is Vhigh, thereby altering the output of the comparator 5 from the conducting potential to the interrupting potential, or vice versa.

As described in the above, the input voltage control device 1B according to the second embodiment of the present invention enables it to control power supply to various load devices adaptively to their input voltages Vin by regulating the resistance values of the variable resistor VR3 and the variable resistor VR4 in the comparative potential generator 4B.

The comparative potential generator 4B may have one invariable resistor, instead of having the two variable resistors VR3 and VR4.

Figure 6:
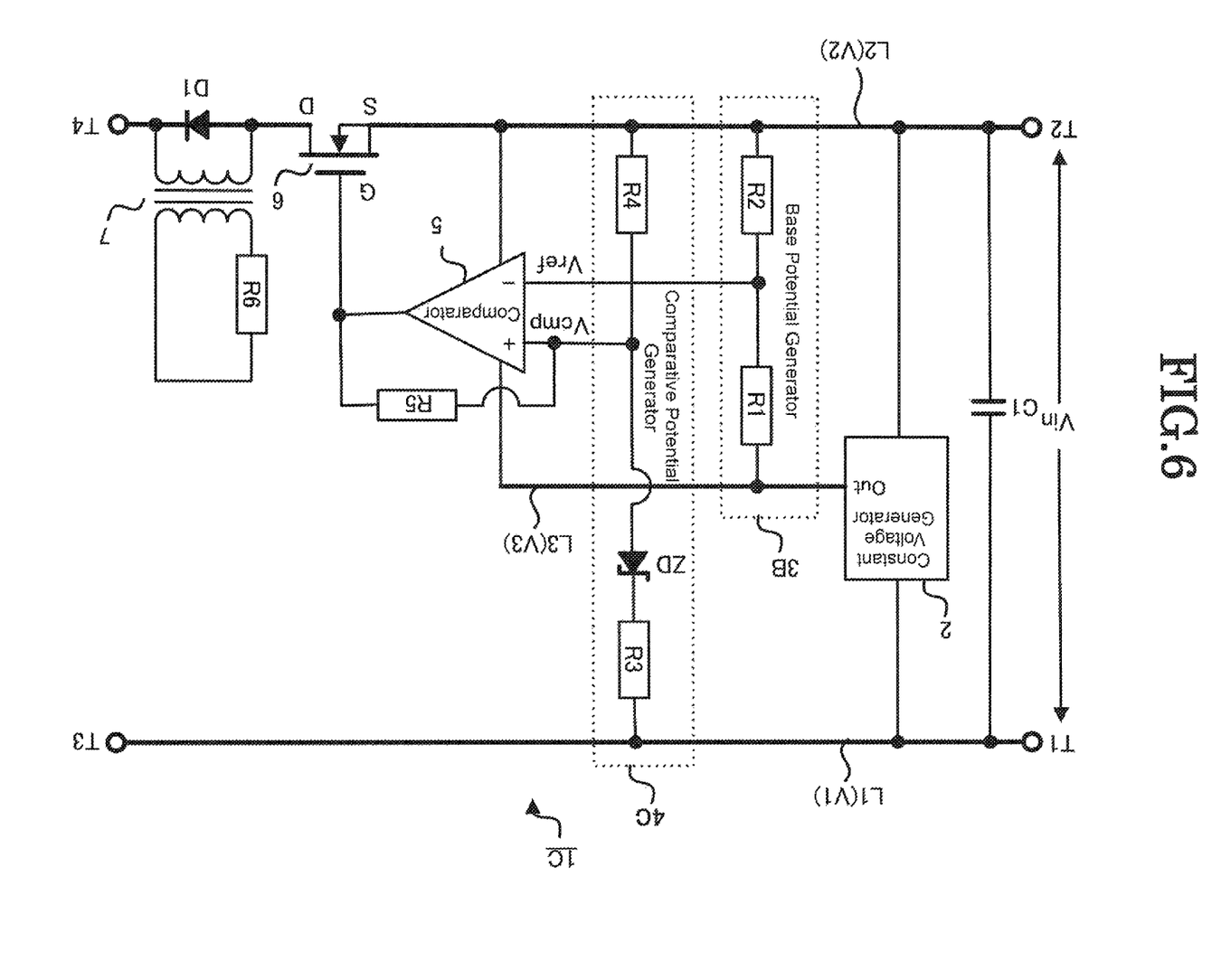
FIG. 6 is a view showing an exemplary configuration of an input voltage control device according to a third embodiment of the present invention.

FIG. 6 is a view showing an exemplary configuration of an input voltage control device 1C according to a third embodiment of the present invention.

The input voltage control device 1C comprises a first power line L1, a second power line L2, a third power line L3, a smoothing condenser C1, a constant voltage generator 2, a reference potential generator 3B, a comparative potential generator 4C, a comparator 5, hysteresis resistor R5, an NMOS transistor 6 (a semiconductor device), a transformer 7, a resistor R6 and a diode D1.

The input voltage control device 1C differs from the input voltage control device 1B of the second embodiment in the configuration of the comparative potential generator 4C. Other members of the input voltage control device 1C are configured in the same way as those of the input voltage control device 1B.

The comparative potential generator 4C is connected to the first power line L1 and the one line of the second power line L2. The comparative potential generator 4C has a resistor R3, a Zener diode ZD and a resistor R4. The resistor R3 has an end connected to the first power line L1 and the other end connected to the cathode of the Zener diode ZD. The Zener diode ZD has its anode connected to an end of the resistor R4. The resistor R4 has the other end connected to the one line of the second power line L2. The potential difference between the first potential V1 and the second potential V2 (or input voltage Vin) is variable.

The Zener diode ZD is a voltage sharing device which shares voltage equivalent to its Zener voltage (or breakdown voltage). The Zener diode ZD lowers the input voltage Vin by the voltage equivalent to its Zener voltage. The resistors R3 and R4 divide the lowered input voltage Vin so as to generate a comparative voltage Vcmp (voltage of 0V to 24V, for example) which is within the range of the potential difference between the third potential V3 and the first potential V1. The comparative potential generator 4C outputs the comparative voltage Vcmp.

Figure 7:
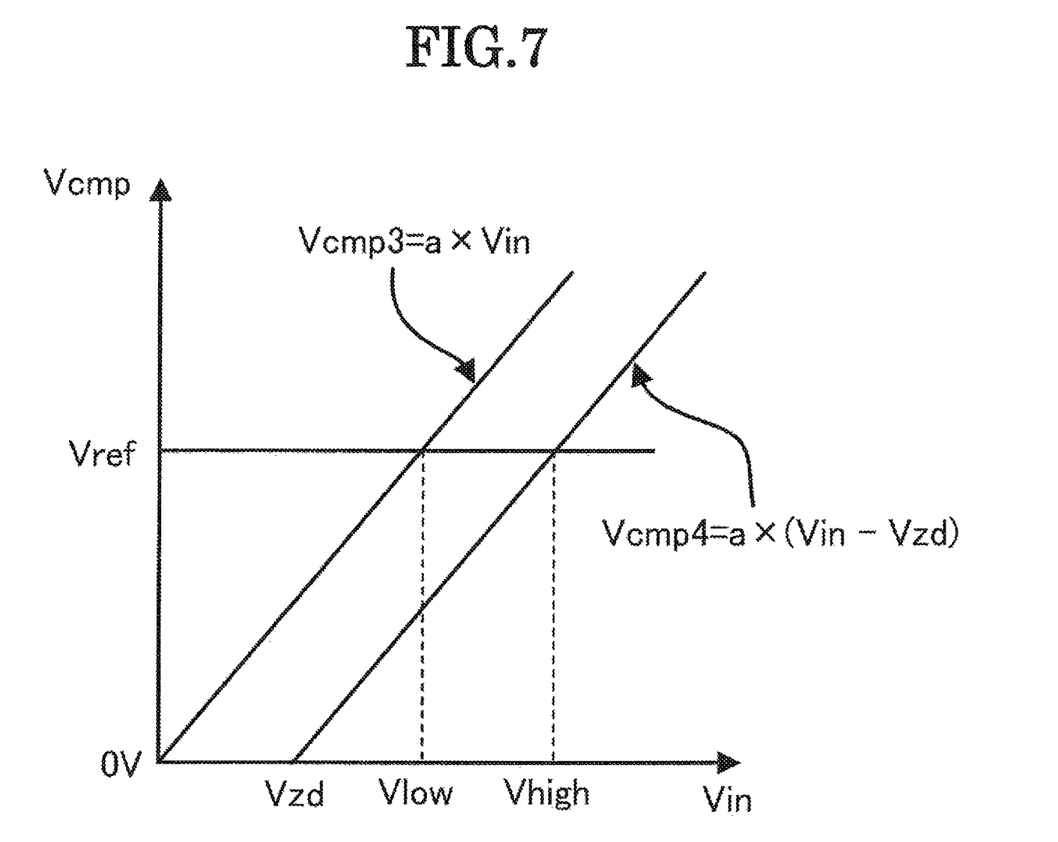
FIG. 7 is a view showing an example of relationship between an input voltage, a reference potential and a comparative potential in the input voltage control device shown in FIG. 6.

FIG. 7 is a view showing an example of the relationship between the input voltage, the reference potential and the comparative potential in the input voltage control device 1C shown in FIG. 6.

The value of the reference potential Vref is given by the above formula (5).

On the other hand, assuming that the resistance values of the resistors R3 and R4 are vr3 and vr4 respectively, and ignoring the existence of the Zener diode ZD, the value of the comparative potential Vcmp is given by proportionally dividing the value of the input voltage Vin as shown in the above formula (2). Given the dividing ratio as a as shown in the above formula (3), the value of a comparative potential Vcmp3, ignoring the existence of the Zener diode ZD, is given by the below formula (11) following the above formula (4). Assuming that the Zener voltage of the Zener diode ZD is Vzd, the value of a comparative potential Vcmp4, when the Zener diode ZD exists, is given by the below formula (12).

$$Vcmp3 = a \times Vin \quad (11)$$

$$Vcmp4 = a \times (Vin - Vzd) \quad (12)$$

As shown in FIG. 7, the comparative potentials Vcmp3 and Vcmp4 each represents a line with a gradient a. The line of the comparative potential Vcmp4 is horizontally shifted to the higher side on the axis Vin by the voltage equivalent to the Zener voltage Vzd. On the other hand, the reference potential Vref represents a horizontal line. Ignoring the existence of the hysteresis resistor R5, the output of the comparator 5 is altered from the conducting potential to the interrupting potential, or vice versa, at the intersecting point of either line of the comparative potential Vcmp3 or Vcmp4 and the line of the reference potential Vref. The line of the comparative potential Vcmp3 intersects the line of the reference potential Vref when the input voltage Vin is Vlow, thereby altering the output of the comparator 5 from the conducting potential to the interrupting potential, or vice versa. On the other hand, the line of the comparative potential Vcmp4 intersects the line of the reference potential Vref when the input voltage Vin is Vhigh, thereby altering the output of the comparator 5 from the conducting potential to the interrupting potential, or vice versa.

As described in the above, the input voltage control device 1C according to the third embodiment of the present invention enables it to control power supply to various load devices adaptively to their input voltages Vin by regulating the Zener voltage Vzd of the Zener diode ZD in the comparative potential generator 4C.

A set of directly connected Zener diodes is capable of sharing higher voltage. For example, a set of two Zener diodes directly connected each having a Zener voltage of 100V is capable of sharing voltage of 200V. In place of the Zener diodes, a shunt regulator may be used as a voltage sharing device which allows change in the sharing voltage.

In the above-described embodiments, the NMOS transistor 6 is disposed between the one line an the other line of the second power line L2. Alternatively, the first power line L1, in stead of the second power line L2, may be divided into two lines and a PMOS transistor may be disposed between the one line an the other line of the first power line L1.

In that case, the current path of the PMOS transistor (between the source and the drain) is turned conductive by inputting to its gate electrode a potential lower by a predetermined voltage than that of the first power line L1, and the current path is turned non-conductive by inputting to its gate electrode a potential equivalent to that of the first power line L1.

Also, in that case, the second power line L2 and the first power line L1 respectively correspond to the first power line and the second power line in the present invention.

It is possible to the configure the device such that a reference potential generator 3A or 3B, a comparative potential generator 4A, 4B or 4C, a comparator 5 and a hysteresis resistor R5 are integrated into a DSP (Digital Signal Processor) and its control program, with the potential difference between the potential V1 of the first power line L1 and the potential V2 of the second power line L2 (or input voltage Vin) being AD-converted to digital signal.

As described in the above, the input voltage control device according to the present invention is capable of controlling power supply to each load device based on the voltage level of the DC bus.

For example, the input voltage control device according to the present invention can be designed to supply power to load devices with low importance such as lighting devices when the voltage of the DC bus is 380V or higher and to stop supplying power when the voltage of the DC bus is less than 380V. On the other hand, the input voltage control device according to the present invention can be designed to supply power to load devices with high importance such as computers when the voltage of the DC bus is 300V or higher and to stop supplying power when the voltage of the DC bus is less than 300V.

In the above-described embodiments of the present invention, various modifications and combinations may be made for convenience of design and other reasons within the scope of the claimed inventions or the inventions described herein.

REFERENCE NUMERALS 1A, 1B, 1C input voltage control device
2 constant voltage generator
3A, 3B reference potential generator
4A, 4B, 4C comparative potential generator
5 comparator
6 NMOS transistor
7 transformer
L1 first power line
L2 second power line
L3 third power line
C1 smoothing condenser
R1, R2, R3, R4, R6 resistor
R5 hysteresis resistor
VR1, VR2, VR3, VR4 variable resistor
ZD Zener diode
D1 diode It is an object of the present invention to provide an input voltage control device capable of controlling power supply to each load device based on the voltage level of the DC bus.

For example, a first power line L1 (a terminal T1) is inputted with a voltage of 300V to 380V and a second power line L2 (a terminal T1) is inputted with a voltage of 0V. The potential difference between the first power line L1 and the second power line L2, or input voltage Vin, is variable. A constant voltage generator 2 outputs a constant potential (voltage of 24V, for example) to a third power line L3. A reference potential generator 3A outputs a reference potential of 10V, for example. A comparative potential generator 4A outputs a comparative potential which is within the range of 0V to 24V, for example, based on the input voltage Vin. A comparator 5 outputs to an NMOS transistor 6 a conducting potential (voltage of 24V, for example) or an interrupting potential (voltage of 0V, for example) depending on the comparison between the reference potential and the comparative potential. When the comparator 5 outputs the conducting potential, the path between the source and drain of the NMOS transistor 6 is made conductive. When the comparator 5 outputs the interrupting potential, the path between the source and drain of the NMOS transistor 6 is made non-conductive.

What is claimed is:
1. An input voltage control device comprising:
a first power line to which a first potential is applied;
a second power line divided into one part and another part, wherein a second potential is applied to said one part;
a third power line;
a constant voltage generator operating on the first potential supplied by said first power line and the second potential supplied by said one part of the second power line and outputting to said third power line a third potential having a constant potential difference from said second potential;
a reference potential generator connected to said third power line and said one part of the second power line, generating a reference potential on the basis of said third potential and said second potential and outputting said reference potential;
a comparative potential generator connected to said first power line and said one part of the second power line, generating a comparative potential on the basis of said first potential and said second potential and outputting said comparative potential;

a comparator operating on the third potential supplied by said third power line and the second potential supplied by said one part of the second power line and alternately outputting a conducting potential or an interrupting potential depending on a comparison between said reference potential and said comparative potential; and a semiconductor device with one terminal of its current path connected to said one part of the second power line, another terminal connected to said another part of the second power line and a control terminal connected to an output terminal of said comparator, the semiconductor device making said current path conductive when the conducting potential is inputted to said control terminal and non-conductive when the interrupting potential is inputted to said control terminal.

2. The input voltage control device as set forth in claim 1, wherein said reference potential generator comprises at least one variable resistor and is capable of changing the reference potential by changing a resistance value of said at least one variable resistor.

3. The input voltage control device as set forth in claim 1, wherein said comparative potential generator comprises at least one variable resistor and is capable of changing the comparative potential by changing a resistance value of said at least one variable resistor.

4. The input voltage control device as set forth in claim 1, wherein said comparative potential generator comprises a voltage sharing device for lowering a potential difference between said first potential supplied by said first power line and said second potential supplied by said one part of the second power line, thereby generating a comparative potential on the basis of a lowered potential difference.

5. The input voltage control device as set forth in claim 1, wherein said semiconductor device is an NMOS transistor and said comparative potential and said reference potential are respectively inputted to a non-inverted input terminal and an inverted input terminal of said comparator.

* * * * *